(12) United States Patent
Feller

(10) Patent No.: US 7,288,878 B1
(45) Date of Patent: Oct. 30, 2007

(54) PIEZOELECTRIC TRANSDUCER ASSEMBLY

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 11/420,495

(22) Filed: May 26, 2006

(51) Int. Cl.
*H01L 41/08* (2006.01)

(52) U.S. Cl. .................. 310/364; 310/334; 310/337; 310/365

(58) Field of Classification Search ............. 310/327, 310/334–337, 363
See application file for complete search history.

(56) References Cited

U.S. PATENT DOCUMENTS

| | | | | |
|---|---|---|---|---|
| 3,854,060 | A | * | 12/1974 | Cook ..................... 310/326 |
| 3,872,332 | A | * | 3/1975 | Butter ..................... 310/334 |
| 5,747,672 | A | | 5/1998 | Parent et al. |
| 6,162,178 | A | | 12/2000 | Garcia et al. |
| 6,570,300 | B1 | | 5/2003 | Riedel et al. |
| 6,739,203 | B1 | | 5/2004 | Feldman et al. |
| 6,822,376 | B2 | | 11/2004 | Baumgartner |

* cited by examiner

*Primary Examiner*—Mark Budd
(74) *Attorney, Agent, or Firm*—David Kiewit

(57) ABSTRACT

A transducer assembly may comprise a thickness-mode piezoelectric ceramic body, a pair of foil conductors with mesh end portions, and a coupling medium used to fill in the interstices in the meshes. The foil conductors are held in contact with the electrode layers by a selected combination of adhesive mechanical clamping forces. One of the conductors is placed between one face of the ceramic body and a window that separates the transducer assembly from a fluid to be measured. The other conductor is held between the other face of the ceramic body and a backing body, which may be an acoustic isolator or a resonant isolating structure comprising a resonant body and an acoustic mass that is substantially heavier than the ceramic element. The structure may additionally comprise isolating sheets of material, which may be polymeric, that are positioned on either side of the resonator so that one of them is between the resonator and the backing body and the other is between the resonator and the surface with the foil conductor.

3 Claims, 2 Drawing Sheets

PIEZOELECTRIC TRANSDUCER ASSEMBLY

BACKGROUND OF THE INVENTION

1. Field of the Invention

This invention relates to piezoelectric transducers and particularly to those transducers in apparatus for determining the rate of flow of a fluid in which the propagation times of ultrasonic signals transmitted through the fluid are detected to determine flow rate.

2. Background Information

Ultrasonic transit time flow sensors, also known as "time of flight ultrasonic flow sensors", detect the acoustic propagation time difference between ultrasonic signals transmitted upstream and downstream through a flowing fluid and process the time difference information to derive the fluid flow rate. The propagation time difference is usually very small and must be detected with high resolution and stability for the sensor to be practical. These sensors typically use piezoelectric transducer elements to generate and detect the acoustic signals. The acoustic coupling of these elements to the fluid, which is complicated by the need to attach electrical connections to the acoustically active transducer surfaces, is generally the major source of sensor instability and error. There is a long-standing need to minimize this problem in a practical and cost effective way.

In U.S. Pat. No. 6,739,203 Feldman et al. teach an approach to making time of flight transducers using piezoelectric ceramic elements in which a metallization layer on the piezoelectric ceramic is wrapped around an edge so that both of the two necessary electrical contacts can be made on the same side of the ceramic body.

In U.S. Pat. No. 6,822,376 Baumgartner describes a contacting arrangement for a piezoelectric element in which a metal mesh is clamped between a metallization layer on the piezoelectric and a metal contact pad on a circuit board.

In U.S. Pat. No. 6,570,300 Riedel et al teach the use of a mesh conductor that is adhered to a surface to make an electrical contact to a piezoelectric bender element.

BRIEF SUMMARY OF THE INVENTION

Resonant piezoelectric transducer assemblies are commonly used in time-of-flight acoustic flow measurement instruments for transmitting and receiving acoustic signals through a fluid isolated from the transducer assembly by a window. In a preferred embodiment of the invention, such a transducer assembly comprises a thickness-mode piezoelectric ceramic body, a pair of foil conductors with mesh end portions, and a coupling medium used to fill in the interstices in the meshes. In this embodiment, the ceramic body may be a disk or tile and is arranged for thickness-mode operation having electrode layers on two parallel facing surfaces. The foil conductors are held in contact with the electrode layers, either by an adhesive bond, a mechanical clamping force, or combination thereof. One of the conductors is placed between one face of the ceramic body and the window, while the other is held between the other face of the ceramic body and a backing body, which may be an acoustic isolator (e.g., a polymeric foam). Among other alternatives, the backing body may also be a resonant isolating structure comprising a resonant body having a thickness corresponding to a quarter of the wavelength at which the transducer operates and an acoustic mass that is selected to be substantially heavier than the ceramic element. The structure may additionally comprise isolating sheets of material, which may be polymeric, that are positioned on either side of the resonator so that one of them is between the resonator and the backing body and the other is between the resonator and the surface with the foil conductor.

The invention also provides a method of coupling a resonant piezoelectric transducer assembly to a window used for separating the transducer assembly from a fluid, as may be desirable in constructing a time-of-flight acoustic flow rate measurement instrument. To practice this method, one may coat an inner surface of the window with a coupling medium, which may be a silicone grease or an adhesive, such as an epoxy. A metal mesh, which is an end portion of a foil conductor is then placed in the mesh so that the coupling medium fills in the interstices between the metal filaments making up the mesh portion of the foil, and then placing a piezoelectric ceramic element on the foil so that an electroded face of the ceramic contacts the foil. The second face of the ceramic body (which may be configured as a disk or tile having two parallel electroded faces) is then coated with the coupling medium and a metal mesh portion of a second foil conductor is placed in the coupling medium. A backing body is used to sandwich the second conducting foil between itself and the ceramic element. The assembly so formed is then clamped so as to squeeze the conducting foils and piezoelectric ceramic between the backing body and the window. If the coupling medium is an epoxy, the clamping force is maintained at least until the epoxy has hardened. If the coupling medium is a grease or some other non-setting material, the clamping force is maintained essentially permanently.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF THE INVENTION

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or.

Figure 3:
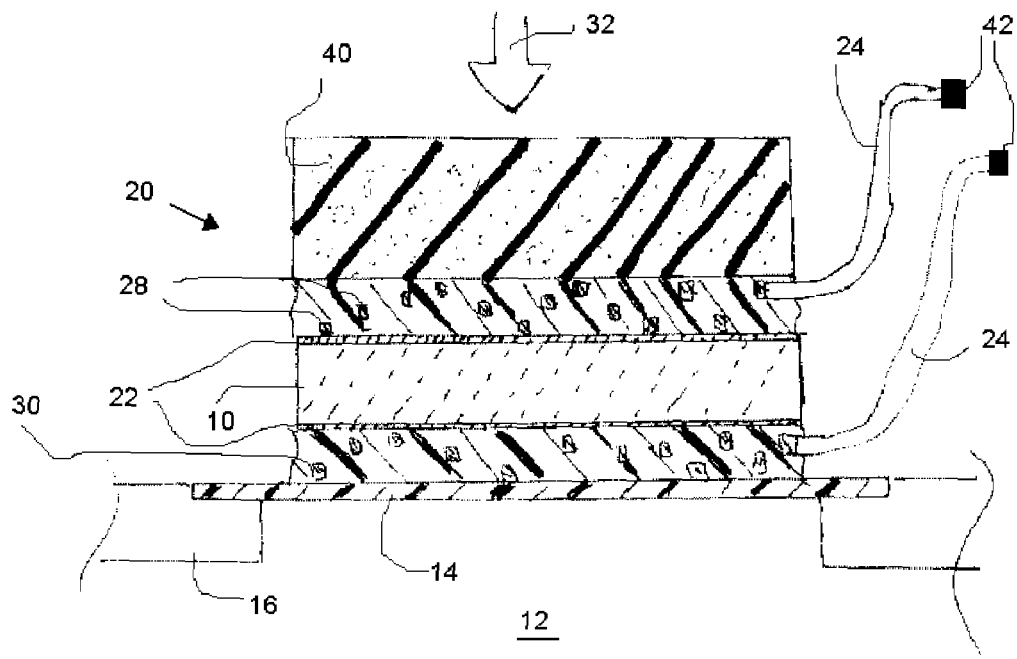
FIG. 3 is a sectional view through a partially completed, and as yet unclamped, assembly of the invention comprising a polymeric foam isolator, where the relative thicknesses of various layers in the structure have been altered in the interest of clarity of presentation.

In acoustic flow measurement equipment it is conventional to separate various electrical components, such as the piezoelectric ceramics 10, from the working fluid 12, as depicted in FIG. 3. The element of the measurement system that performs this function is an acoustically transparent window 14 that may be integrally formed with a wall of the system (e.g., may be a portion of a pipe) or that may be a separate, thinned element that is fixedly attached to one of the walls 16 of the system. In the context of the ensuing discussion, the window 14 may be viewed as a portion of the transducer assembly 20, or, alternately, as that portion of the flow system against which the balance of the transducer assembly is held—e.g., by a resilient member or by a suitable adhesive.

A preferred piezoelectric transducer element 10 is designed for thickness-mode excitation, and comprises an electrically insulating piezoelectric active substrate, which is typically formed from a lead zirconate titanate (PZT) ceramic body. As is conventional in a thickness mode transducer element, one finds metallic electrode layers 22 disposed on respective parallel flat faces of the element.

In a typical piezoelectric element 10, the ceramic body may have a length of 0.200" and a width 0.125", where both the length and width are measured along an electroded active surface. The element may have a thickness between the two parallel faces bearing electrodes of 0.020". This typical element normally operates at a resonant frequency of about 4 megahertz.

Figure 1:
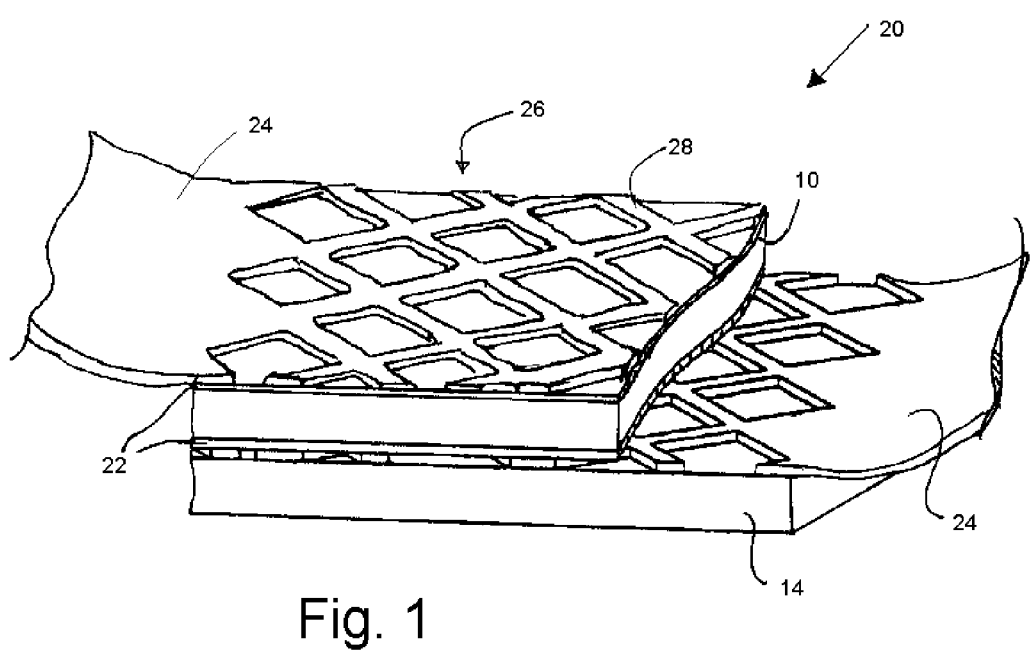
FIG. 1 is a perspective view showing perforated metal foil contacts on a piezoelectric ceramic.

Turning now to FIG. 1, one finds a partial perspective view of a preferred assembly 20 of the invention showing a piezoelectric element 10 with connecting foils 24 adjacent both active surfaces of the ceramic element. The mesh end portions 26 of the foils 24, when in mechanical contact with respective electrodes make the electrical connection to those surfaces.

The foils 24 are preferably made of thin copper with an anti corrosion plating and generally have a mesh portion 26 with a substantial open fraction. For a transducer element 0.200" wide×0.120 deep×0.020" thick, a mesh material with foil thickness of 0.0015" and preferably having a diamond opening pattern of 0.050" long×0.035" wide with a 0.004" strand 28 or filament width is a good choice and provides approximately a 70% open fraction. FIG. 1 shows the rectangular outline of the meshes to illustrate how they match the outline of the transducer element. The openings are filled with a coupling material portion 30 (viz. FIG. 3), typically consisting of an epoxy or a silicone grease, to efficiently couple the acoustic energy from the upper and lower surfaces of the ceramic body 10 as desired.

Figure 2:
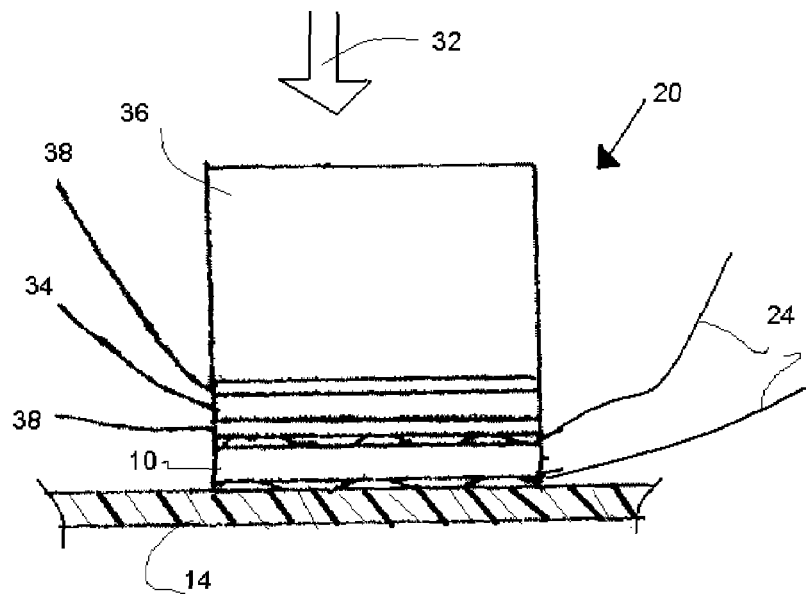
FIG. 2 is a side elevational view of an assembly of the invention comprising a resonator and an acoustic mass.

A side sectional view of the transducer element 10 with connecting foils 24 is illustrated in FIGS. 2 and 3. In general, the mesh portion 26 of the foil is initially non-planar—a fact that actually aids in providing a good contact with the electrode on the piezoelectric ceramic. In some cases the mesh filaments may have burrs around the edges of the punched-out portions. In other cases the foil may be slightly bent or twisted during handling so as to become crinkled. This is schematically depicted in FIG. 3 where the mesh filaments 28 are shown at various vertical positions before being squeezed (where the pending squeeze force is indicated by an open arrow 32) against the transducer element 10. The initial departure from being perfectly flat assures that the meshes 26 will be under some tension and will to continue to apply pressure to the transducer element surfaces. The foil 24 used for the meshes 26 may incorporate some degree of spring characteristic to assure the continuity of electrical contact to the ceramic elements. In preferred embodiments the foils 24 are used in a manner similar to conventional wire leads and are also sufficiently flexible to allow their respective second ends (i.e., the ends that are not contacting the ceramic element) to be brought out to electrical contact points 42 distal from the window.

A preferred embodiment of the present invention is illustrated in the side sectional view of the mounted transducer stack of FIG. 2. In this embodiment the stack 20, consisting of connecting foils 24, a transducer element 10, an aluminum resonator 34, a tungsten carbide acoustic mass 36 and a window 14 are bonded together with an epoxy adhesive. The window 14 provides environmental protection from the fluid 12. A thin plastic film 38, which may be a polysulfone film, is shown as a layer on each side of the resonator 34 and is used to provide a consistently defined thickness and a degree of resilience to the stack. The film 38 provides a buffer between elements of differing coefficients of thermal expansion and can also prevent the adhesive layer from being squeezed too thin. In some embodiments, the film 38 can be perforated so that the portion of the epoxy within the perforations is thicker than the rest of the epoxy, thereby keeping the epoxy layer from being too thin and weak. In other embodiments, such as those using a silicone grease as the coupling medium 30, one may do without the plastic film. This is particularly true if the components that would otherwise capture the film between them have flat surfaces, free from any damaging asperities or the like. That is, one of the functions of the polymer film 38 is to accommodate surface irregularities and departures from flatness, and the film can be omitted if the mating surfaces are sufficiently flat.

When a plastic film 38 is used in a stack 20 that is to be assembled with an epoxy coupling medium it is preferred to pre-treat the surfaces of the film with an organic solvent prior to bringing it into contact with the epoxy. This can substantially improve the strength of an epoxy-polysulfone film bond. It may be noted that the same sort of pre-treatment technique to some window materials can also result in a superior bond between the active ceramic 10 and the window 14. A solvent mixture of methylene chloride, methyl acetate, and methyl methacrylate monomer, commercially available from the IPS Corporation under the trade name Weld-On 4, has been found effective in preparing the bonding surfaces of some polymers such as polysulfone for adhesion with a low risk of crazing. Abrading with a suitable abrasive, such as a 120 grit abrasive paper, can also be effective in improving the bond between the adhesive and substrate.

The stack 20 is squeezed together by a squeezing force 32 and the epoxy hardened so that the meshes 26 are under some degree of permanent stress to maintain contact pressure against transducer elements. Alternatively, an acoustic coupling agent like silicone grease may be used between one or more of the stack components and the stack squeezed with a spring (not shown) against the window. That is, in some embodiments some of the elements of the stack may be attached by means of a permanent adhesive while others are coupled together by silicone grease or the like. Moreover, a spring may also be used to additionally squeeze a stack which incorporates adhesive bonding.

Although the preferred piezoelectric element depicted in the drawing is a rectangular parallelpiped having two parallel active faces, it will be recognized that other shapes could also be used. For example, one could consider a piezoelectric element configured as a cylindrical shell for providing an arcuate acoustic beam and used with a connector having a cylindrical surface. Alternately, one could consider an element having a flat surface for contacting a connector, a spherical or cylindrical surface clamped against a housing and a cylindrical wall connecting those surfaces, where an element of that sort could be used to provide a range of acoustic frequencies.

In one preferred embodiment, the resonant stub 34 is formed from an aluminum body having the same lateral dimensions as those of the associated piezoelectric element. Although one can calculate that an aluminum body thickness of 0.010" would substantially equal one quarter of a wavelength of an acoustic excitation generated by operating the preferred piezoelectric element at a resonant frequency of about 4 MHz, a preferred embodiment used a thinner aluminum body. This is because the resonant load seen by the piezoelectric element is also dependent on all the materials clamped between the ceramic and the acoustic mass. In particular, a preferred 0.0015" copper foil conductor contributes an appreciable amount to the resonance. Thus, a preferred structure used a 0.006" thick aluminum body. Correspondingly, a preferred acoustic mass is a chunk of tungsten carbide or other highly dense material selected to maximize the mass that can be used within a suitably sized housing. It should be recognized that many other materials could serve that purpose.

The resonant structure described above is preferred for applications in which high ambient pressures inveigh against having any voids in the structure and those in which relatively high temperatures prohibit the use of many polymers. However, in some applications where such conditions are not anticipated and where some performance can be sacrificed in the interest of lower cost of fabrication, one may elect to use a polymeric foam isolator 40 on the non-window side of the transducer, as depicted in FIG. 3.

Assembly of a preferred transducer may be completed by filling the remaining empty internal volume of the housing with an encapsulating, or potting, material (not shown). In cases where clamping force is maintained during operation the encapsulant must nevertheless be soft enough to allow the force exerted by the spring to generate whatever slight movements are necessary to maintain the acoustic connection between the piezoelectric element and the window.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A piezoelectric transducer assembly for transmitting and receiving acoustic signals through a fluid isolated by a window portion of the assembly from all other portions of the assembly, the transducer assembly comprising:
    a thickness-mode piezoelectric ceramic body having respective electrode layers disposed on two parallel facing surfaces;
    first and second foil conductors, each having two respective ends, at least one respective end portion of each foil conductor configured as a respective mesh having a substantial open fraction, the mesh end portion of the first foil conductor captured between the window and a first of the two electrode layers on the piezoelectric ceramic so that the first foil conductor abuts the first electrode layer, the mesh contact end portion of the second foil conductor abutting the second of the two electrode layers and captured between the piezoelectric ceramic and a backing body, the respective second ends of the foil conductors extending outwardly beyond the ceramic body to respective electric contacts distal from the body;
    wherein the backing body comprises two polymeric isolation sheets, a resonator body having two parallel surfaces, and an acoustic mass, wherein:
    a first of the two isolation sheets abuts the second foil conductor;
    the resonator body is captured between the first and a second polymeric isolation sheets; and
    the acoustic mass is disposed so as to capture the second polymeric isolation sheet between the mass and the resonator body; and wherein
    portions of at least one coupling medium are disposed in the open portions of the respective mesh end portions of the first and second foil conductors, on each of the two surfaces of the resonator body, and at an interface between the acoustic mass and the second polymeric isolation sheet.

2. The transducer assembly of claim 1 wherein the resonator body comprises an aluminum member having a thickness no more than one quarter of a wavelength of the acoustic signals transmitted and received by the transducer.

3. The transducer assembly of claim 1 wherein the acoustic mass is selected to be substantially more massive than a sum of masses of the resonator body and the piezoelectric ceramic body.

* * * * *